(12) United States Patent
Ouimet

(10) Patent No.: US 8,024,207 B2
(45) Date of Patent: Sep. 20, 2011

(54) ATTRIBUTE MODELER

(75) Inventor: Kenneth J. Ouimet, Scottsdale, AZ (US)

(73) Assignee: SAP AG, Walldorf (DE)

( * ) Notice: Subject to any disclaimer, the term of this patent is extended or adjusted under 35 U.S.C. 154(b) by 1874 days.

(21) Appl. No.: 11/144,277

(22) Filed: Jun. 3, 2005

(65) Prior Publication Data

US 2005/0283354 A1 Dec. 22, 2005

Related U.S. Application Data

(60) Provisional application No. 60/577,371, filed on Jun. 4, 2004.

(51) Int. Cl.
*G06F 17/30* (2006.01)
(52) U.S. Cl. .................................................. 705/7.11
(58) Field of Classification Search ............ 705/27
See application file for complete search history.

(56) References Cited

U.S. PATENT DOCUMENTS

| | | | |
|---|---|---|---|
| 6,842,719 B1 * | 1/2005 | Fitzpatrick et al. | 702/182 |
| 2004/0083152 A1 * | 4/2004 | Markov et al. | 705/36 |
| 2004/0181498 A1 * | 9/2004 | Kothare et al. | 706/45 |
| 2004/0234113 A1 * | 11/2004 | Miga | 382/128 |

* cited by examiner

*Primary Examiner* — Romain Jeanty
*Assistant Examiner* — Luis Santiago
(74) *Attorney, Agent, or Firm* — Schwegman, Lundberg & Woessner, P.A.

(57) ABSTRACT

A system and process for modeling attributes of a set of observed data. The system and process may include an initialization process providing for a likelihood function, a first order prior function; a calibration data set; a flexible interface module in which the likelihood function, the first order first order prior function, and the second order prior function are written in a programming language; a parameter bounding process in which parameters determined to be too large are interpolated or sequentially locked down; an outlier flagging process which identifies outliers using the gradient of the likelihood function; and an output process which reports information that may include outlier forces, confidence intervals, and other factors that are unique to this modeler and useful in refining the model.

3 Claims, 6 Drawing Sheets

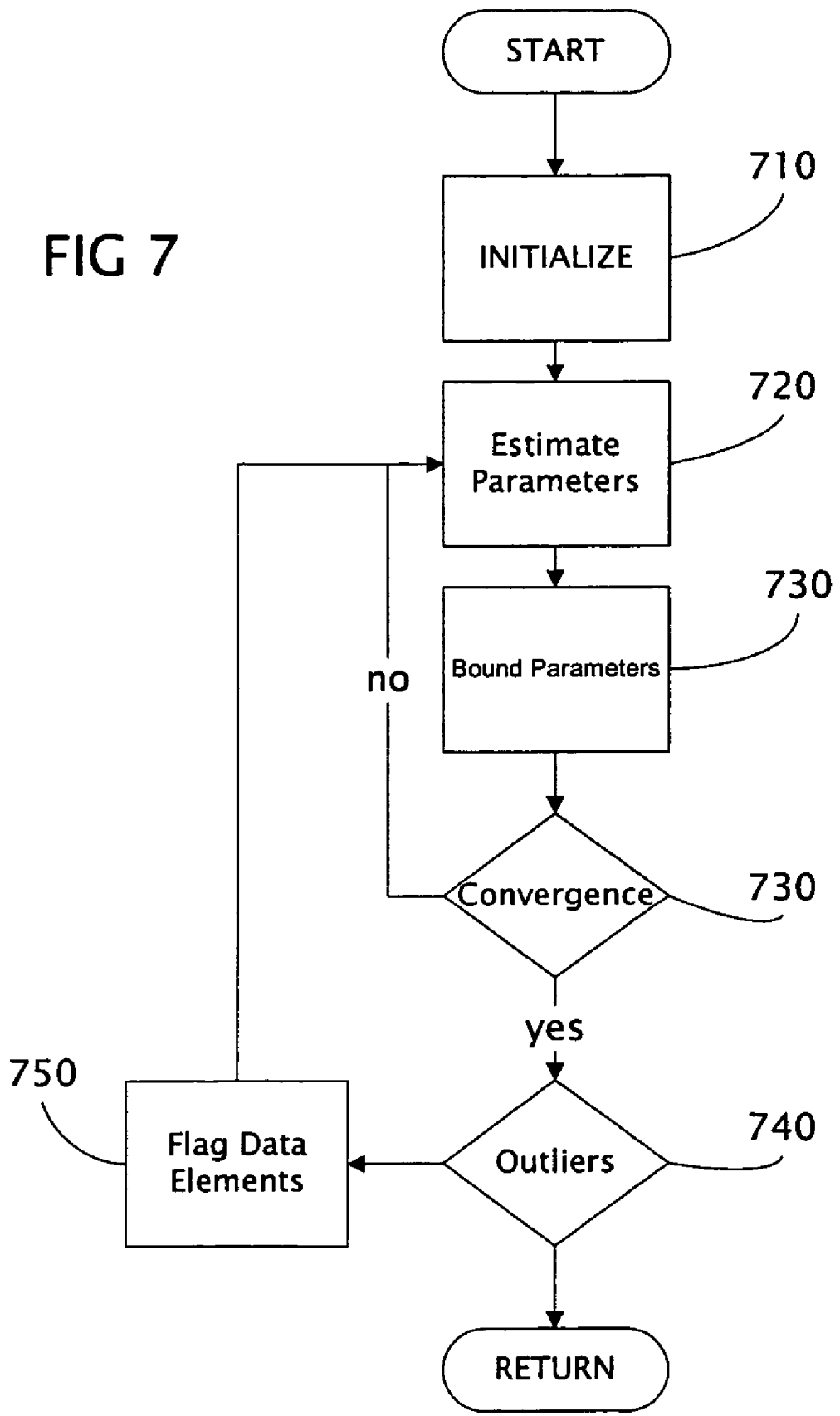

ATTRIBUTE MODELER

CLAIM OF PRIORITY

Priority is claimed to provisional application No. 60/577,371, filed Jun. 4, 2004, which is incorporated herein by reference.

FIELD OF THE INVENTION

The present invention relates generally to the field of estimating parameters for mathematical models. Particular application has been found in the field of econometrics. More specifically, the present invention relates to processes, systems, and devices for mathematically modeling and controlling strategic objectives in enterprise planning models.

BACKGROUND

Practical application in business has been found for numerical modeling techniques in permitting businesses to make decision and take actions that can enhance revenue, market share, and other desirable objectives. Construction of detailed business models has been made more feasible by the availability of more detailed empirical observations from sources such as, for example, point of sale devices that can capture detailed information not previously available. There exists a need, therefore, for new approaches to analyze this available information in order to make better informed decisions. Innovations as described in this application have been found to render such modeling efforts comparatively more effective than models constructed without benefit of these teachings, as has been reflected in commercial success these innovate techniques have enjoyed in comparison with other less effective techniques against which they compete. The innovations described herein are being used to enable businesses to increase profits, increase sales volume, increase market share, improve risk profiles, manage strategic goals, and forecast more accurately quantities such as profit and origination volume.

Parameter estimation is conceptually simple. Data are observed empirically in the realm to be modeled for variates believed to be correlated. A form of function is postulated, the function being characterized by a set of parameters. Parameter estimation is a process for calculating, determining, or otherwise estimating those parameters characterizing that correlation function so as to minimize in some sense the difference between values predicted by the correlation function and values observed empirically.

Although parameter estimation is conceptually simple, many practical factors make the process more complicated. Many theoretical solutions to the problem of parameter estimation are known for those circumstances where data are well-behaved in adhering to conventional parametric statistics. But in the real world, various circumstances often encountered in empirically observed data often limit the effectiveness of these theoretically sound processes. Practical factors complicating parameter estimation include: lack of information, co-linearity, heteroskedacity, over-dispersion, bad data, and serial correlation.

One factor which may complicate parameter estimation in practice is a lack of useful information. Where, for example, the empirical data describes, for example, sales history, the price of an item may have never changed leading to no information about the price elasticity. In standard regression analysis this would produce an indeterminate matrix. This is a consequence of the fact that this empirical data is a record of observations, not the result of experimental design. Circumstances in general over the period of time observed may never have presented variations for which in theory one would prefer to have empirical observations.

Another factor which may complicate parameter estimation is co-linearity in factors. Factors here refers to those elements of the empirically observed data that are considered to be inputs in the correlation function. For example, it may be desired to model sales rate, volume, or quantity as a function of factors including item price and promotional efforts. In the empirically observed data, it may occur that the price changes at essentially the same time that the item is put on promotion. A practical problem in conventional parameter estimation is how to know how much of any change in sales is attributable to the price drop and how much is attributable to the promotional efforts. Such colinearity leads to a similar problem in conventional analysis as would the lack of information discussed above.

Another factor which may complicate parameter estimation is heteroskedacity. The term heteroskedacity denotes the effect that errors in observations may change with each measurement. For example, in sales data the error estimate associated with a promotional event may be much higher than the error estimate associated with a regular sales event. In general, the error estimates for observations at key points in the data set for which it is desired to construct an attribute model may not be the same as the error estimates for observations in other parts of the data set.

Another factor which may complicate parameter estimation is over-dispersion in the distribution characterizing data empirically observed. It has been found in practice that many naturally occurring distributions do not follow simple and conventional known distributions such as, for example, a Gaussian distribution or Poisson distributions. Instead, distributions observed in practice may be over-disperse or may present wider tails than would be expected with simple distributions.

Another factor which may complicate parameter estimation is bad or incomplete data. For example, where empirically observed data models events such as product sales, a strong spike in sales can have a strong influence on the parameter estimates Such a strong spike may occur in the empirically observed data at essentially the same time as some change in the attribute being modeled, but that similarity in time may be entirely coincidental. The spike in sales could instead have been cased by some other factor for which the model has no visibility. Such coincidental variation can clearly cause a problem in the model. In practice, one technique used to try to minimize the effects of such bad or incomplete data is to filter outliers before modeling. However, indiscriminate filtering of outliers can cause valuable information to be wrongly classified as outliers and discarded. Those outliers may correspond to points in the model in which one is most interested. There is a need, therefore, for a more intelligent and principled way to identify outliers less arbitrarily.

Another important factor which may complicate parameter estimation is serial correlation. Data empirically observed may be a function of time, reflecting trends, seasonality, and periodicity. In general, data observed may be in part a function of previously observed data. What happened yesterday may a good indicator of what will happen today.

Parameter estimation, while conceptually simple, thus becomes a very challenging problem due to these practical issues. While there is commercial software available to estimate model parameters, products now available in general do not sufficiently productize this process. Existing approaches using known, commercially available software typically require a sophisticated analysis from a highly qualified individual analyst (typically a person having a doctorate in a relevant field) to "build the model". Building the model is a process where the analyst reviews and tweaks the model based on intuition and an understanding of potential parameter estimation problems. Building the model is not a scalable process for large enterprises that are required to manage millions of models. For example, a retailer may have hundreds of thousands of products that are sold in thousands of stores throughout the world, corresponding to hundreds of millions of individual product models which must be managed.

In many attribute models as currently practiced a single parameter is employed to model the equation. That parameters is usually postulated to adhere to some parametric distribution, such as a Gaussian, Poisson or Student T distribution. There exists a need therefore for a modeling framework for analyzing business problems and the like in which the parameters are not limited to one dimension. There further exists a need for a modeling framework for analyzing business problems and the like in which the model is not restricted to a linear form or the assumption of a particular parametric distribution.

Recently, there has been a strong interest in "Bayesian-Shrinkage". Bayesian shrinkage is a statistical technique that essentially shrinks or pulls a parameter value towards its average. Bayesian-Shrinkage helps to reduce the problems associated with lack of information and co-linearity when one has a good external estimate for a parameter. However, it is frequently the case that one does not have a good external estimate for a parameter. Furthermore, "Bayesian-Shrinkage" does not incorporate knowledge concerning (or otherwise take advantage of) relationships between parameters. Often, the analyst or other individual seeking to model empirically observed data may know or suspect some functional relationship between or among parameters. This expectation of a functional relationship may be based on factors such as intuition, experience, or knowledge of physical laws showing that there is some functional relationship between parameters. Current applications provide no way of providing this information to the parameter estimation process. Also, Bayesian-Shrinkage does not help with bad data that tend to throw parameters to unrealistically extreme values. There exists a need, therefore, for an attribute modeler better able to overcome these problems that exist in known approaches to the attribute modeling.

The term outliers denotes unlikely events that can bias parameter estimates. Outliers are anomalies that need to be removed from the modeling data set. Typically in systems in use today outliers are flagged based on a Gaussian distribution. If the data point is more than N standard deviations from the mean it is flagged as an outlier and eliminated from the modeling data set. Unfortunately, this simple process may eliminate much of the important data for certain applications, such as modeling sales data. Using this criteria of deviation from a Gaussian distribution, most promotional events would be classified as outliers and eliminated. There exists a need, therefore, for a better way to identify outliers in an attribute modeler.

DESCRIPTION

The invention, together with the advantages thereof, may be understood by reference to the following description in conjunction with the accompanying figures, which illustrate some embodiments of the invention.

BRIEF DESCRIPTION OF THE DRAWINGS

FIG. 7 illustrates the flow of control of data and processes in an embodiment of an attribute modeler in accordance with the invention.

DETAILED DESCRIPTION INCLUDING EXEMPLARY EMBODIMENTS

Figure 1:
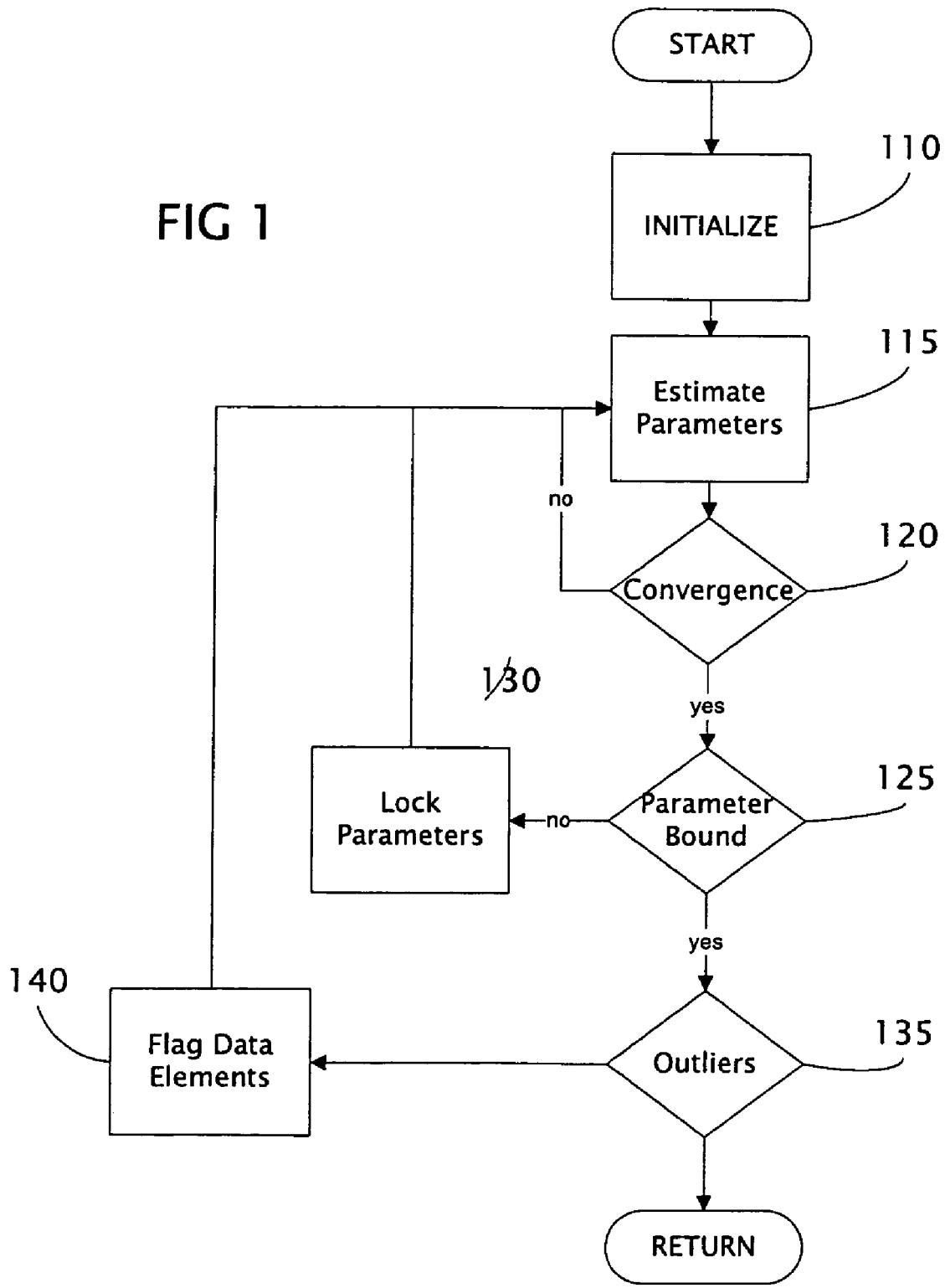
FIG. 1 depicts a flow of control in a system implementing one embodiment of an attribute modeler according to the current invention.

While the present invention is susceptible of embodiment in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

Input to an embodiment of an attribute modeler according to the present invention may include, for example, an event key, a calibration data set, an attribute set, a weight or confidence, and an outlier flag. The event key is a unique key usable to identify each event in the data set. The calibration data set, herein referred to most often as Y, can be usable to tune the model. The attribute set, herein referred to most often as X, can be a set of attributes associated with the calibration data set Y. The weight or confidence, herein most often referred to as W, can identify the weight or confidence in a record. The Outlier Flag can be used to identify those events, records, etc., in the data set believed to be anomalies.

General Structure Including First and Second Order Priors

The attribute modeler here described provides in one embodiment a modeling framework for plug-and-play modeling. This attribute modeler can provide in one embodiment a framework wherein different models, likelihood functions, and prior probability distributions can be quickly implemented.

In one embodiment of an attribute modeler according to the present invention a likelihood function LF is provided as input, wherein the likelihood function can be defined as a function or a procedure in a computer programming or modeling language and linked to the attribute modeler. The likelihood function LF can be a log-likelihood function that describes the probability of observing the calibration data Y given the attributes X and attribute parameters a. The gradient and Hessian of the likelihood function can be provided as optional inputs, depending on the estimation method used.

In one embodiment of an attribute modeler according to the present invention a first order prior $\Phi_1$ can provided as input. The first order prior $\Phi_1$ that describes the probability of observing the attribute parameters a based on previous information and the second order prior parameters $\beta$. The gradient and Hessian of the first order prior $\Phi_1$ can be provided as optional inputs, depending on the estimation method used. The first order prior $\Phi_1$ therefore can in some embodiments overcome the limitations of techniques that rely on a single-dimensional modeling parameter, because the first order prior $\Phi_1$ can in general be multidimensional. The first order prior $\Phi_1$ furthermore can in some embodiments overcome the limitations of techniques in which parameters are constrained to particular expected statistical distribution, because the first order prior $\Phi_1$ can in general describe non-linear relationships of any form that an analyst or user can devise.

The first order prior $\Phi_1$ provides an analyst with a method by which to constrain particular relationships between and among parameters. For example, the first order prior could be used to specify that a parameter $\alpha_i$ be, for example, 30% greater than another parameter $\alpha_j$. The first order prior $\Phi_1$ alone, however, does not provide a mechanism for the attribute modeler to determine for itself the relationship between particular parameters.

In one embodiment of an attribute modeler according to the present invention a second order prior $\Phi_2$ can be provided as input. The second order prior $\Phi_2$ is preferably optional input that describes the probability of observing the second order prior parameters $\beta$. The second order prior parameters $\beta$, as described elsewhere in this application, can be used to explore and model relationships between and among first order prior parameters $\alpha$. If the second order prior $\Phi_2$ is specified, then the gradient and the Hessian of the second order prior $\Phi_2$ can be optional inputs depending on the estimation method used.

Both the first and second order priors are treated as general non-linear functions. The first order prior provides a way to introduce information external to the data set into the modeling process. The first order prior can specify a particular relationship between different components of the set of parameters in $\alpha$, but does not provide a means for the modeler to model that relationship between parameters in a. The second order prior provides a way for an embodiment of the attribute modeler to explore and model the relationship between different components of the set of parameters $\alpha$, which relational information is contained in the parameter set $\beta$. The second order prior in one embodiment provides the analyst with the ability to pass information to the model describing how parameters are related. This ability to describe relationships among parameters is a powerful feature of embodiments incorporating the second order prior.

An embodiment of an attribute modeler in accordance with the present invention is concerned with determining a set of first order prior parameters $\alpha$ and second order prior parameters $\beta$ that maximize the posterior probability distribution $\Psi$. When referring to one or more specific parameters within the first order prior $\alpha$ or the second order parameters sets prior parameter set $\beta$, a subscript or subscripts will be used, such as $\alpha_i$ or $\beta_i$. The component Y denotes the dependant variates being modeled. The component X denotes the variates representing the attributes which are believed to influence Y. The posterior probability distribution $\Psi(\alpha,\beta|Y,X)$ describes the probability associated with a given set of first order parameters $\alpha$ and second order parameters $\oplus$ given the calibration data set, Y and attribute set X. This posterior probability distribution is set equal to the sum of three parts: (1) a log-likelihood function $LF(Y|X,\alpha)$ which describes the probability of observing the outcomes Y given a set of attributes X for each observation and parameters $\alpha$, (2) the first order prior $\Phi_1(\alpha|\beta)$ which describes the probability of observing the parameters $\alpha$, and (3) a second order prior $\Phi_2(\beta)$ which describes the probability of observing the parameters $\beta$.

The first order prior $\Phi_1(\alpha|\beta)$ describes the probability of observing a set of parameters a given the set of parameters $\beta$.

The use of such a first order prior provides a way to include certain information external to the data set in the modeling process. This information external to the data set can come from many sources such as, for example, (1) expert judgment, (2) estimates based on other data, and/or (3) estimates from other methods or indicators. The first order prior may also be dependent on the second order prior parameters $\beta$ which will be described in the next section. In one embodiment the attribute modeler will treat the first order prior as a general non-linear function, in which the parameters are or may be coupled. The first order prior can, in one embodiment, be specified as a function or procedure in a higher-level language, with the parameter set a being passed as operands to that function or procedure. This approach in one embodiment of an attribute modeler according to the present invention can provide a very flexible interface for the attribute modeler, in which the modeler can handle virtually any prior function the expert analyst can devise.

As described hereinabove, the first order prior $\Phi_1(\alpha|\beta)$ provides a means by which to supply the attribute modeler with expected values of the parameter set $\alpha$. However, the first order prior $\Phi_1(\alpha|\beta)$ does not provide a way to supply the attribute modeler with information concerning the relationships between different values of $\alpha$. It may be desirable in some circumstances to provide the attribute modeler with information about the expected relationship between and among the individual components $\alpha_i$ within the parameter set $\alpha$. The second order prior $\Phi_2(\beta)$ and the parameter set $\beta$ associated with that second order prior $\Phi_2(\beta)$.

For example, if $\alpha_1$ represents the price elasticity for purchasing a small box of a given brand of laundry detergent, and $\alpha_2$ represents the price elasticity for the large box of the same detergent, then one might expect the price elasticity $\alpha_2$ of the large box to be a function of the price elasticity $\alpha_1$ of the small box. If, for example, it is expected that $\alpha_2=1.3\alpha_1$, then the information that the value of $\alpha_2$ is expected to relate to the value of $\alpha_1$ could be incorporated into the first order prior $\Phi_1(\alpha|\beta)$ by specifying a first order prior in a form such as $\Phi_2=(\kappa_1/2)(\alpha_2-\beta_1\alpha_1)^2$, and requiring that $\alpha_2=\beta_1\alpha_1$. The second order prior $\Phi_2(\beta)$ can then be used to provide the attribute modeler with the information that $\beta_1$ is expected to be 1.3 by defining a second order $\Phi_2(\beta)$ in a manner such as, for example, $\Phi_2(\beta)=(\kappa_2/2)(\beta-1.3)^2$. An embodiment of an attribute modeler in accordance with the present invention treats the second order prior $\Phi_2(\beta)$ as a general, non-linear function (similarly to the treatment of the first order prior $\Phi_1(\alpha|\beta)$). Thus, an embodiment of an attribute modeler in accordance with the present invention can operate upon any function that the analyst can devise and specify.

The parameter set a and the parameter set $\beta$ can both be represented collectively by a parameter set here denoted as $\gamma$. The number of components in the parameter set $\gamma$ is equal to the sum of the number of components in the parameter set $\alpha$ and the number of components in the parameter set $\beta$. The parameter set $\alpha$ and parameter set $\beta$ can both be seen as sequences of parameters, because each of their individual components $\alpha_i$ and $\beta_i$ are associated with a sequential index number i. The parameter set $\gamma$ is similarly a sequence of components, consisting of first the components $\alpha_i$ of the parameters set a (listed in order) followed by the components $\beta_i$ of the parameter set $\beta$ (also listed in order).

Maximizing the Posterior Probability Function $\Psi$

One embodiment of the attribute modeler in accordance with the present invention calculates the parameter set $\gamma$ by maximizing the posterior probability function $\Psi$. As is typical in Bayesian analysis, the logarithms of the respective probability functions are used, permitting addition probability function terms. The formula for the posterior probability function Ψ can be expressed using the parameter set γ in the place of the first order parameter set α and second order parameter set β. The posterior probability function Ψ(γ|Y,X) is equal to the sum of the likelihood function LF(Y|X,γ) plus the first order prior $\Phi_1(\gamma)$ plus the second order prior $\Phi_2(\gamma)$.

A preferred method of maximizing the posterior probability function Ψ is by means of the inverse Hessian method. Other methods of maximizing a function are known in the art, and in general it is within the scope of this invention to use any methods now known or hereafter developed for maximizing the posterior probability function Ψ.

The likelihood function LF in general can be highly non-linear. For such a general, non-linear function it may be suitable in one embodiment to estimate the parameter set γ iteratively.

In one embodiment, an iterative algorithm can be implemented by approximating with a hill-climbing technique using the gradient and the Hessian of the posterior probability function Ψ, both the gradient and the Hessian being taken over the coordinate space of the components $\gamma_i$ of the parameter set γ to find the direction of greatest change in the posterior probability function Ψ over the parameter set γ. The initial estimate of γ for the iteration n=0 can be supplied as input in one embodiment of an attribute modeler according to the present invention.

The gradient operator ∇ denotes the vector-like operator composed of partial derivative operators over the coordinate space of the components $\gamma_i$ of the parameter set. The dimension of the gradient operator ∇ is thus equal to the total number of attributes being modeled.

It will thus be seen that a simple formula for calculating iterative adjustments to the parameters set γ can be derived. The iterative adjustment Δγ is the inner product of the inverse of the Hessian matrix, with the gradient ∇ of the probability function Ψ. The approach embodied in this numerical technique is known in the art commonly referred to as the inverse Hessian method. Other methods can also be used for maximizing the posterior probability function Ψ. All other methods now known or later developed for maximizing the posterior probability function Ψ are considered to be within the scope of this invention.

Tri-Diagonal Double-Bordered Hessian Matrix

Figure 2:
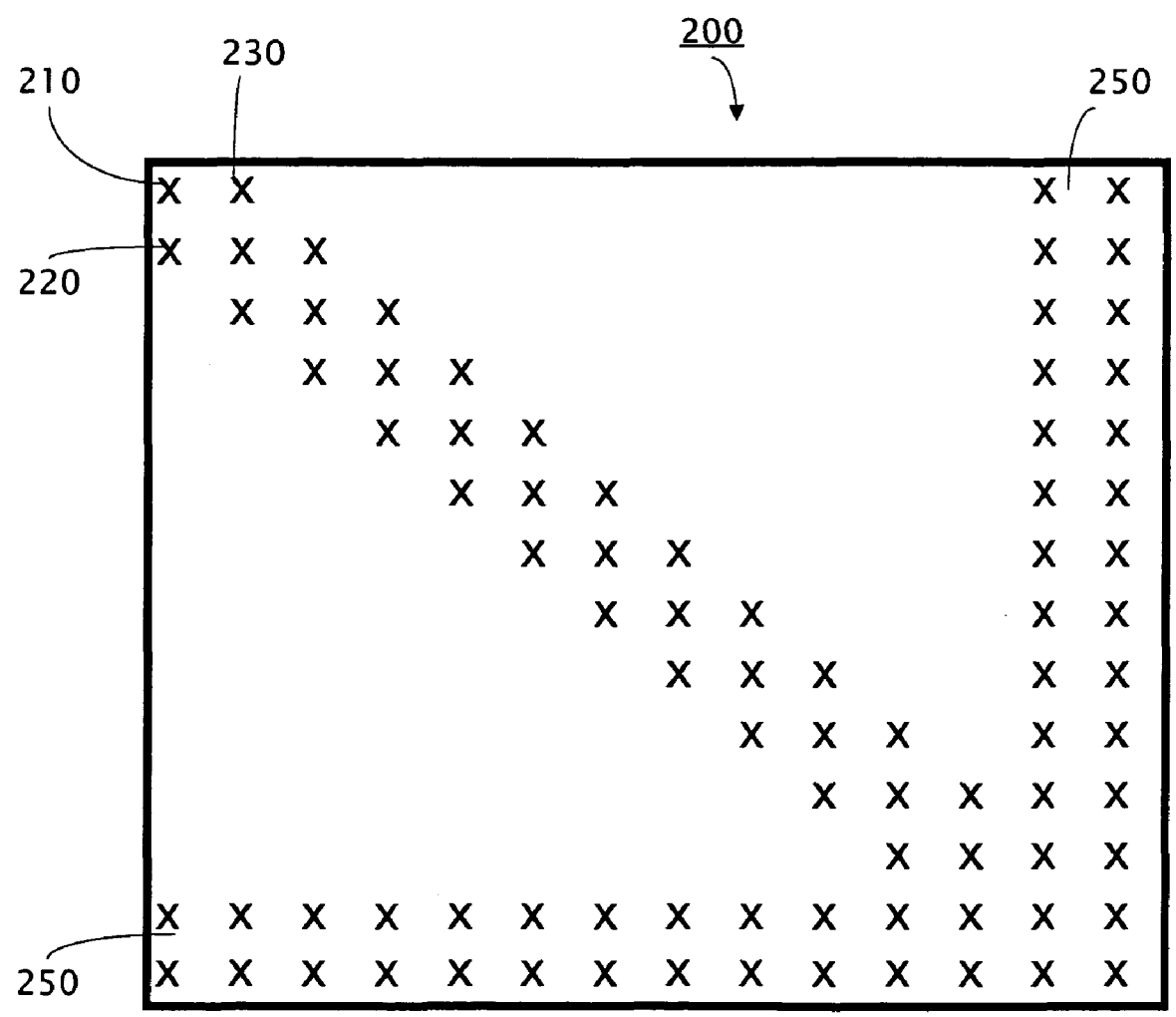
FIG. 2 depicts schematically a tri-diagonal banded matrix forum.

In one particular embodiment of an attribute modeler according to the present invention, significant improvements in performance can be achieved when the Hessian matrix is a tri-diagonal double-bordered matrix as illustrated in FIG. 2. A diagonal matrix has non-zero elements only along the diagonal (210). A tri-diagonal matrix in general has non-zero element on its diagonal (210), super-diagonal (230), and sub-diagonal (220). A tri-diagonal double-bordered matrix as that terminology is used herein denotes the sum of a tri-diagonal matrix and a double-bordered matrix, in which double-bordered matrix the only non-zero components are in the last few (M) rows and/or columns (250). Such an embodiment incorporating a Hessian matrix in tri-diagonal double-bordered matrix has been found to have particularly useful industrial application because demand modeling problems often result in a Hessian with a tri-diagonal double-bordered matrix structure. The tri-diagonal form may be the result of serial correlation. For demand modeling problems which exhibit a Hessian with a tri-diagonal double-bordered matrix, substantial increases in performance, speed, and power, can be realized by employing matrix inversion techniques that take advantage of the sparcity in the tri-diagonal double-bordered matrix.

The number of floating point operations (FLOPS) required to solve a general matrix equation is proportionate to the number of rows cubed. Where N is the number of rows in the matrix, the number of FLOPS required for a general solution to a matrix equation is on the order of $N^3$. For a tri-diagonal double-bordered matrix with N rows and M bands the number of floating point operations can be significantly lower and in generally proportional to the number of rows times the sequence of number of bands, that is, on the order of $N \times M^2$.

This tri-diagonal double-bordered form may be particularly likely to occur in circumstances seeking to model serial correlation. The serial correlation components generally couple only with adjacent terms and non-serial correlation parameters. To provide the desired tri-diagonal double-bordered structure the serial correlation components can be provided as the first set of parameters.

An exemplary embodiment will be a decision model where one is applying serial correlation. For purposes of this exemplary embodiment it is postulated that there are about 100 time parameters and about 10 price and promotional parameters. An algorithm which does not take advantage of the sparcity in the matrix will require on the order of $110^3 = 1,331, 000$ FLOPS. The number of operations to solve the tri-diagonal double-bordered matrix is much smaller. An algorithm specifically designed for operation on a banded matrix will take on the order of $100 \times 10 \times 10 = 10,000$ FLOPS. Thus, an embodiment of an attribute modeler according to the present invention that is optimized for solving a tri-diagonal double-bordered Hessian matrix can solve this relatively modest problem more than 100 times more quickly. It can thus be seen that in an embodiment in which such efficiencies can be realized, greater scalability can also be achieved allowing for more complex modeling including more attributes in the same amount of time as would otherwise be required for less complex models.

If all of the parameters $\gamma_i$ in the parameter set γ are unconstrained, then when the maximum of likelihood function will occur where the gradient of the likelihood function is zero, as expressed in the formula ∇LY(Y|X,γ)=0. More generally, it will often occur that some of the parameters in the parameter set γ are constrained. Some parameters in the parameter set γ may be constrained either through priors or through minimum and maximum constraints on the decision parameters. If some parameters in the parameter γ are constrained, then in general the gradient of the likelihood function will not be equal to zero.

The gradient of the likelihood function measures the "force" that the data is exerting in favor of a different maximum. When, because of constraints imposed on the parameters, the gradient of the likelihood function is non-zero at the calculated maximum, that the gradient of the likelihood function is a measure of the force the imposed constrain is exerting to offset the force imposed by the data. Thus, the gradient of the likelihood function at the calculated maxima is useful information. That information can assist in understanding where the model is being the most constrained. That information may also indicate a problem with the constraints or may indicate data issues.

Flexible Interface

In one embodiment of an attribute modeler according to the present invention, any non-linear likelihood function and prior probability distributions can be passed and incorporated without changing the interface. The generality of this prior probability function is an improvement over known modeling approaches in those embodiments incorporating the flexible interface. The generality of this prior probability function and the flexibility of the interface in one embodiment provides the analyst with a great deal of control over the modeling. The functions can in one embodiment be defined as functions and procedures in a high-level language (taking as input the parameters of the model) and linked into the attribute modeler Control Over Parameters In one embodiment of an attribute modeler according to the present invention the process of computing parameters characterizing the model can be controlled and facilitated by features such as parameter estimation, bounding of parameters, and convergence criteria. Embodiments of an attribute modeler according to an aspect of this invention may provide enhanced stability of model parameters without sacrificing model accuracy, and may provide for the ability to be easily configured.

In general, any parameter estimation technique can be implemented without departing from the teachings of the present invention. In one embodiment a special function is provided for tri-diagonal double-bordered matrices to take advantage of their sparcity and to provide significant increases in speed.

In one embodiment an upper and lower bound for each parameter can be used to bound the parameter. The parameters that exceed the bounds are locked down one at a time. In general, locking down one parameter may affect the spread of other parameters. The sequence in which parameters are locked down can be prioritized by a user supplied priority, by the magnitude of the force the data is exerting on the parameter, by some other prioritization method, or by some combination of the above.

In one embodiment, a maximum number of iterations can be implemented to limit the amount of time that is spent on a parameter estimate. In addition, a unique tolerance or set of convergence criteria can be provided for each parameter.

Figure 3:
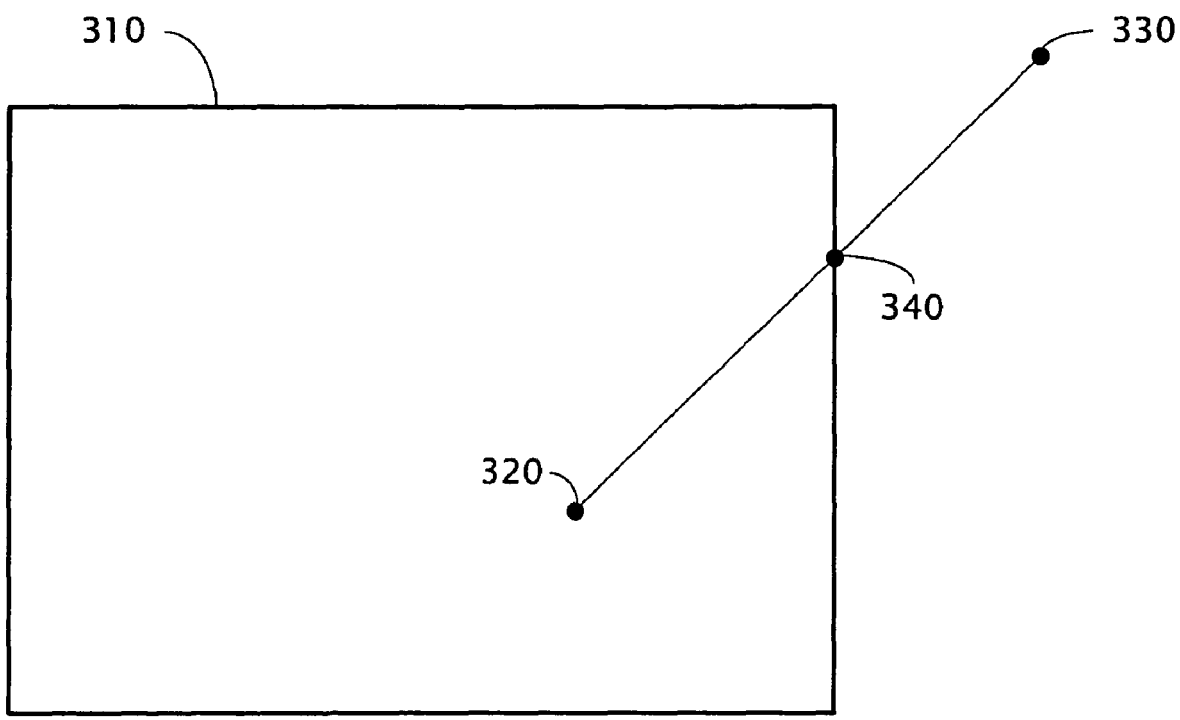
FIG. 3 graphically depicts the interpolatory parameter bounding routine.

In another embodiment the parameter bounding process can interpolate parameter values along the permissible boundary using the values of the parameter in the current iteration and the value of the parameters in the prior iteration. FIG. 3 graphically depicts the interpolatory parameter bounding routine. The parameter bounding process of this embodiment ensures that the parameters stay within their bounds. If the new parameter estimate $\gamma^{(n)}$ (330) is outside, the parameter estimate is pulled back towards the previous estimate $\gamma^{(n-1)}$ (320) until it is within bounds. A value r describes the relative distance the parameters values are allowed to extend to the new estimate without crossing any parameter bounds. The value r is first initialized to r=1. Next for each parameter a new value of r is determined. If $\gamma^{(n)} < \gamma_{min}$ then r is set equal to the lesser of r and $(\gamma_{min} - \gamma^{(n-1)})/(\gamma^{(n)} - \gamma^{(n-1)})$. If $\gamma^{(n)} > \gamma_{max}$ then r is set equal to the lesser of r and $(\gamma_{max} - \gamma^{(n-1)})/(\gamma^{(n)} - \gamma^{(n-1)})$. Then, the new value of the parameter estimates are calculated by setting $\gamma^{(n)}$ equal to $r(\gamma^{(n)} - \gamma^{(n-1)}) + \gamma^{(n-1)}$.

Outlier Flagging

In one embodiment of an attribute modeler according to the present invention, the log-likelihood function can be used in the identification of outliers. Unlike Gaussian and similar probability distributions often used in other systems for identifying outliers, the log-likelihood function can account for promotions, seasonality, and other causal events that influence sales. The log-likelihood function accounts for these events because it is part of the model that has been constructed based on empirical observation.

In general, the presence of outliers can affect the validity of the model constructed including the log-likelihood function. Accordingly, it may be necessary to constrain parameters by, for example, putting bounds on them. In an embodiment in which the parameters are bounded by such constraints, a reasonable degree of integrity of the log-likelihood function is maintained. That computed log-likelihood function can then be used to identify outliers. After outliers have been identified, the attribute modeler may be run again to confirm the integrity of the log-likelihood function.

After the process has determined parameter estimates that are within specified acceptable bounds, the likelihood function can be used in one embodiment to calculate a likelihood value associated with that estimate. After the parameters have been estimated and all estimates are within acceptable the bounds, a user supplied probability threshold can be used in conjunction with the likelihood function in one embodiment to flag outliers. If any outliers are flagged the model can be re-estimated removing these outlier records from the parameter estimation process.

Output Including Modeling Information

In addition to outputting the $\alpha$ and $\beta$ parameters for the first order prior and the $\beta$ parameters for the second order prior, one embodiment of an attribute modeler according to the present invention can also output information about the force that the data is exerting on the parameters, the inverse Hessian associated with the model, and an identification of outliers. This information can then be analyzed to determine if the model is over-constrained and to classify potential problems with the data; can be incorporated as input in subsequent efforts to remodel the data in order to accelerate convergence; and can be used to develop confidence intervals in the data.

One example of modeling information that can be included in output in one embodiment is the force the data is exerting on each parameter. This force data can be valuable information (1) for analyzing the models to determine whether the model is over-constrained or (2) for classifying potential problems with the data.

Another example of modeling information that can be included in output in one embodiment are all records that have been identified as outliers. This identification of outliers can be valuable information that (1) can provide insight into systematic data problems, (2) can facilitate identification of overconstrained models, and (3) can be sent down upon a re-model to accelerate the modeling process.

Another example of modeling information that can be included in output in one embodiment is the inverse Hessian associated with a particular run of an embodiment of the attribute modeler. The inverse Hessian can be used to develop confidence intervals for each parameter in the model. The inverse Hessian may provide a good approximation of the covariance matrix for the parameters. The diagonal elements of the inverse Hessian similarly provide the standard error for each parameter. Such use of the inverse Hessian can be found in, for example, the book Numerical Recipes in C—Second Edition, by William H Press, Saul A Teukolsky, William T. Vetterling, Brian P. Flannery, Cambridge, 1994, which is herewith incorporated herein by reference. It is an advantage of one embodiment of an attribute modeler according to the invention that useful information such as the inverse Hessian is computer/incidental to the process of constructing the model.

Process Flow

With reference now to FIG. 1, there is depicted a process flow chart illustrating process flow in an embodiment of an attribute modeler according to the invention.

An Initialization Process (110) is provided in one embodiment to set up various aspects of the process. The routine can be initialized with the iteration counter n set equal to zero (n=0). The routine can further be initialized with and $\gamma(0)=\gamma'$. Here, $\gamma'$ is an original estimate of the parameters. The input comprising the original estimate of parameters can be supplied from any suitable input means including but not limited to a computer, user, data storage device or a combination thereof.

An Estimate Parameters Process (115) is provided in one embodiment, in which any effective approach can be used to estimate the parameters. The iteration counter is updated to n=n+1. A method is used to estimate the change in each parameters, where each parameter is updated according to the formula to $\gamma^{(n)} = \gamma^{(n-1)} + \Delta\gamma$. Many methods are known in the art for estimating parameters during this iterative step. The Inverse Hessian method is described in greater detail elsewhere in this application. Particular advantages are also discussed elsewhere in this application regarding the Inverse Hessian method for a tri-diagonal double-bordered matrix. Other known techniques which may be employed in the parameter estimation process (115) include, but are not limited to, Marquardt-Levenberg method, Variable Metric method, Conjugate Gradient method, and Single Value Decomposition method.

A Convergence Test (120) can be provided in one embodiment of an attribute modeler according to the invention. Different criteria can be specified for convergence. For example, convergence criteria can be specified based on the relative and absolute incremental difference in the parameter estimate γ or in the likelihood function LF.

A convergence criteria can be specified based on the absolute incremental difference in the parameters estimate γ according to a formula such as, for example, $|\gamma^{(n)} - \gamma^{(n-1)}| < \Delta\gamma_{abs}$, where $\Delta\gamma_{abs}$ is a criteria that may be specified beforehand by a user or analyst. This exemplary convergence test indicates that the incremental improvement in the parameter estimates is growing sufficiently small in absolute terms to indicate that the parameter estimate may be approaching convergence.

A convergence criteria can be specified based on the relative incremental difference in the parameters estimate γ according to a formula such as, for example, $2|\gamma^{(n)} - \gamma^{(n-1)}|/(|\gamma^{(n)}| + |\gamma^{(n-1)}|) < \Delta\gamma_{rel}$, where $\Delta\gamma_{rel}$ is a criteria that may be specified before-hand by a user or analyst. This exemplary convergence test indicates that the incremental improvement in the parameter estimates is growing sufficiently small in comparison to previous changes to indicate that the parameter estimate may be approaching convergence.

A convergence criteria can be specified based on the absolute incremental difference in the likelihood LD according to a formula such as, for example, $|LF^{(n)} - LF^{(n-1)}| < \Delta LF_{abs}$ where $\Delta LF_{abs}$ is a criteria that may be specified before-hand by a user or analyst. This exemplary convergence test indicates that the incremental improvements in the likelihood function LF are growing sufficiently small in absolute terms to indicate that the likelihood function LF may be approaching convergence.

A convergence criteria can be specified based on the relative incremental difference in the likelihood function LF according to a formula such as, for example, $2|LF^{(n)} - LF^{(n-1)}|/(|LF^{(n)}| + |LF^{(n-1)}|) < \Delta LF_{rel}$ where $\Delta LF_{rel}$ is a criteria that may be specified before-hand by a user or analyst. This exemplary convergence test indicates that the incremental improvement in the likelihood function LF is growing sufficiently small in comparison to previous changes to indicate that the likelihood function LF may be approaching convergence.

In one alternative embodiment, utility can be defined such that all causal factors are dimensionless so that the decision parameters are dimensionless. By providing for the attribute modeler in this way in a particular embodiment, the need for relative convergence criteria can be eliminated and can the Convergence Test (120) can be based solely on absolute convergence criteria.

The Convergence Test (120) can evaluate whether some or all of any convergence criteria specified have been met. For each iteration, the maximum number of iterations actually taken $n_{max}$ is incremented. If sufficient criteria, as specified by the user, operator, or analyst, have been met then control passes to a Parameter Bounds test (125). On the other hand, if sufficient criteria, as specified by the user, operator, or analyst, have not been met then the iteration count n is incremented. In one embodiment of an attribute modeler according to the present invention, a maximum permissible number of iterations $N_{max}$ can be specified. If the iteration count n exceeds the maximum permissible number of iterations $N_{max}$ then control passes to the Parameters Bounds Test (125). If sufficient criteria, as specified by the user, operator, or analyst, have not been met and the iteration count n does not exceed the maximum permissible number of iterations $N_{max}$ (where a maximum number of iterations has been specified), the control passes back to the Estimate Parameter Process (115).

A Parameters Bounds Test (125) is provided in one embodiment of an attribute modeler according to the invention. The user, operator, or analyst can optionally specify minimum acceptable values $\gamma_{min}$ and maximum acceptable $\gamma_{max}$ values for the parameter γ. Control can be passed to a Lock Parameter Process (130) if any parameters are outside acceptable bounds, as specified by the formula $\gamma_{min} \leq \gamma \leq \gamma_{max}$. If all parameters are within acceptable bounds, control can be passed to an Outliers Test (135).

A Lock Parameter Process (130) can be provided in one embodiment of an attribute modeler according to the invention. The min and max bounds for parameters can be implemented by locking down one or more parameters and re-modeling. In a preferred embodiment, one parameter at a time is selected and locked down and the modeling is performed again. It is preferred in this embodiment to lock down one parameter at a time because after locking one parameter others may not need to be locked. In one embodiment, all parameters that exceed the bounds can be sorted according to a sort criteria. If a priority has been specified for parameters that priority can be used in one embodiment as a sort criteria for sorting the parameters that exceed acceptable bounds. Alternatively, if a force associated with each parameters has been calculated by, for example, computing an inverse Hessian of the likelihood function LF (as described elsewhere in this application), the magnitude of that force component can be used as a sort criteria in one embodiment to sort parameters. The parameter at the beginning of the sorted list (based on the highest sort criteria value such as, for example, the highest force or the highest priority or some combination of those two with each other and/or with other sort criteria) can be locked to either $\gamma_{min}$ or $\gamma_{max}$ whichever is closer. Following lock down, the remaining free parameters can be re-estimated by passing control back to the Estimate Parameters Process (115).

An Outliers Test (135) can be provided in one embodiment of an attribute modeler according to the invention. Each record in the data set can be tested with the log-likelihood function, as described elsewhere in this application. The event can be identified as an outlier if it exceeds a user specified outlier threshold $LF_{outlier}$. The test can be in the form $LF(\hat{y}|x,\gamma) - LF(y'|x,\gamma) < LF_{outlier}$, where $\hat{y}$ is the measured event in empirical observation and y' is the model's prediction. If any events are identified as outliers that had not been previously so identified, control can be passed to a Flag Outliers Process (140). If no new events are identified as outliers, then control can be returned to any calling procedure and output associated with the run can be generated.

A Flag Outliers Process (140) is provided in one embodiment of an attribute modeler according to the invention. If any outliers have been identified that were not identified previously then those new outliers can be flagged in the data set. All parameters can be unlocked and the parameters are re-estimated with those outliers from the parameter estimation process.

Referring now to FIG. 7, there is illustrated the flow of control of processes and data in an alternative embodiment of an attribute modeler in accordance with the invention. Control passes first to an Initialize Process (710) which initializes the routine. Control passes to an Estimate Parameters Process (720) which uses any suitable process for estimation of parameters providing a sufficient convergence. Control passes next to a Bound Parameters Process (730) which ensures that parameters stay within acceptable bounds. Control passes next to a Passed Convergence Criteria Test (740), after which flow of control branches depending on the outcome of the test. Control later passes to an Outliers Test (750), after which flow of control branches depending on the outcome of the test. Control may pass to a Flag Data Elements Process (760), which marks outliers identified outliers in the data set.

The routine is initialized in the Initialize Process (710). In an embodiment of the attribute modeler the iteration counter n is initialized to zero. The parameter set γ is initialized to the initial parameter estimates. The input can be supplied by a computer, user, data storage device or a combination.

The Estimate Parameters Process (720) can use any suitable process for estimation of parameters which provides acceptable convergence. Examples of parameter estimation processes that can be used include Inverse Hessian computation, Inverse Hessian applied to a Tri-diagonal Band Matrix, Marquart-Levenberg technique, Variable Metric technique, Conjugate Gradient technique, and Single Value Decomposition values.

The Bound Parameters Process (730) ensures that the parameters stay within acceptable bounds the parameter bounding process can interpolate parameter values along the permissible boundary using the values of the parameter in the current iteration and the value of the parameters in the prior iteration. FIG. 3 graphically depicts the interpolatory parameter bounding routine. The parameter bounding process of this embodiment ensures that the parameters stay within their bounds. If the new parameter estimate $\gamma^{(n)}$ (330) is outside, the parameter estimate is pulled back towards the previous estimate $\gamma^{(n-1)}$ (320) until it is within bounds. A value r describes the relative distance the parameters values are allowed to extend to the new estimate without crossing any parameter bounds. The value r is first initialized to r=1. Next for each parameter a new value of r is determined. If $\gamma^{(n)} < \gamma_{min}$ then r is set equal to the lesser of r and $(\gamma_{min} - \gamma^{(n-1)})/(\gamma^{(n)} - \gamma^{(n-1)})$. If $\gamma^{(n)} > \gamma_{max}$ then r is set equal to the lesser of r and $(\gamma_{max} - \gamma^{(n-1)})/(\gamma^{(n)} - \gamma^{(n-1)})$. Then, the new value of the parameter estimates are calculated by setting $\gamma^{(n)}$ equal to $r(\gamma^{(n)} - \gamma^{(n-1)}) + \gamma^{(n-1)}$.

The Convergence Test (740) tests whether an acceptable level of convergence has been achieved. For example, embodiments may test the absolute differential in the parameter vector, the relative differential in the parameter vector, the absolute differential in the likelihood function, or the relative differential in the likelihood function as described in more detail hereinabove. If convergence has not been achieved in control passes back to a next iteration of the Estimate Parameters Process (720). If convergence has been achieved in accordance with the selected convergence criteria, or if a predefined maximum number of iterations have been exceeded, control can pass to an Outlier Test (750).

The Outlier Test (750) can test any and/or all records of the data set with a suitable test such as for example in one embodiment the log-likelihood function. The event can be labeled as an outlier in the Flag Data Elements Process (760) if it passes a user specified outlier threshold $LF_{outlier}$. If any new outliers are flagged, all parameters can be re-estimated after eliminating the outliers from the parameter estimation process.

Exemplary Modes of Practicing Embodiments

Next are discussed various exemplary embodiments or modes of practicing an Attribute Modeler according to the current invention. These embodiments reflect the flexibility and generality of an Attribute Modeler according to the current invention. Without changing.

One particular practical mode of practicing an embodiment of an attribute modeler according to this invention is in a market share model. The market share reflects what percentage a particular merchant's sales of a product or item represent out of total sales of all merchants, or merchant's similarly situated, for that product or item. There exists a need, for example, in business for information about the way in which changes in factors that can affect a consumer's purchasing decisions will impact on a product's market share. Such information may assist a merchant, for example, in making better informed decisions about its activities with respect to those factors over which it has control. The attributes to be modeled can include factors which may affect purchasing decisions such as, for example, price, display, signage, advertising, merchandising, season, location, and others. In an embodiment of attribute modeler according to the present invention to model market share, the empirically observed data about market share and the attributes is supplied in order to acquire information about what changes to these attributes may affect market share.

Another particular practical mode of practicing an embodiment of an attribute modeler according to this invention is in an elasticity attribute model. There exists a need for information concerning the relationship between price elasticities and various attributes relating to factors such as, for example, product, category, store, promotional attributes, store location, demographic attributes, and others. In this mode of practicing a particular embodiment of an attribute modeler the price elasticities may have been calculated, determined, or extracted previously from a consumer purchasing model. The calibration data set for this mode of practicing a particular embodiment of an attribute modeler will include those calculations and empirical observations of the factor's being modeled.

Another particular practical mode of practicing an embodiment of an attribute modeler according to this invention is in an promotional lift model. There exists a need for information concerning the relationship between promotional lift and various attributes relating to factors such as, for example, promotional, product and store attributes and others. In this mode of practicing a particular embodiment of an attribute modeler the promotional lift may have been calculated, determined, or extracted previously from a consumer purchasing model. The calibration data set for this mode of practicing a particular embodiment of an attribute modeler will include those calculations and empirical observations of the attributes being modeled.

Another particular practical mode of practicing an embodiment of an attribute modeler according to this invention is in a time dependent demand model. There exists a need for information concerning the relationship between demand for a product and temporally dependant attributes including, for example, season, week in month, month in quarter, day of week, holidays, weather, special events, and others. The calibration data set for this mode of practicing a particular embodiment of an attribute modeler will include the demand and empirical observations of the attributes being modeled.

Another particular practical mode of practicing an embodiment of an attribute modeler according to this invention is in a basket share model. There exists a need for information concerning the relationship between the "basket share" or percentage of baskets that contain a given item and attributes that may affect the purchasing decision such as, for example, price, signage, advertising, merchandising, season, location, and others. The calibration data set for this mode of practicing a particular embodiment of an attribute modeler will include the basket share and empirical observations of the attributes being modeled.

Another particular practical mode of practicing an embodiment of an attribute modeler according to this invention is in a count model. There exists a need for information concerning the relationship between the count or the quantity of an item purchased in each basket and attributes that can affect the purchasing decision such as, for example, price, signage, advertising, promotional offers, merchandising, season, location, and other. The calibration data set for this mode of practicing a particular embodiment of an attribute modeler will include the count and empirical observations of the attributes being modeled.

Reference Price Example

When making a pricing decision, it is desirable to know the customer's reference price, which is what the customer expects to pay for the product. Customer reference price can be affected by a variety of factors.

Approaches that have previously been used to acquire customer reference price information exhibit various shortcomings making them less than fully satisfactory. For example, customer surveys have in the past on occasion been used to try to determine what customers expect or are willing to pay for a product. Customer surveys, however, can be expensive to conduct. Customer surveys also tend to rely on relatively small samples of customers, which may not be representative. In general, customer surveys also tend to be only qualitative in nature.

How the customer perceives prices can affect the customer reference price. The customer reference price may also be affected by what the customer has paid for the same product in the past, or by what the customer generally pays and/or has paid for similar products or products perceived to be similar. The amounts competitors charge for the same and/or similar products and/or products customers perceive as similar can also affect the customer reference price. Customer reference price can also be influenced by external factors the customer believes are influencing prices. Examples of such external factors may include shortages, such as frost killing crops or an oil embargo; increased costs; and availability of new technology relevant to the product.

There exists therefore a need for an efficient and accurate method to quantify the customer reference price and which can take into account many factors including factors such as those listed above. A mode of practicing one embodiment of the invention described herein uses historic and current price data, coupled with product, competitor and other attributes and market indicators to quantify a reference price.

An embodiment for calculating a reference price can provide for calculating a perceived price p for each item. Perceived price can be determined by any effective method such as, for example, that method disclosed in U.S. Pat. No. 6,094,641, which is incorporated herein by reference. The perceived price model accounts for psychological factors which influence how a price is perceived. For example, some consumer's may take more notice of the difference between, for example, $2.99 and $3.00 than the difference between, for example, $2.94 and $2.93. Although for both the difference is actually one penny, the difference which crosses the threshold to $3.00 may have a greater impact on consumer perception. Another parameters cane be incorporated in the model to adjust for the strength of this psychological effect, which can in general be different for different market segments.

The embodiment for calculating a reference price can also provide for attribute decomposition. Price attributes are used to map a set of perceived prices into a set of attribute prices. Each price is described with a set of attributes that describe qualities such as, for example, the product, store, time, customer, promotion and any market indicators. Price attributes can be composed into a price attribute matrix C.

The embodiment for calculating a reference price can also provide for a likelihood function to describe the probability of observing a set of perceived prices given the attribute model. One form of likelihood function in one embodiment can be described as $LF = \Sigma_i (\rho_i - x_i C_{i,a})^2$. The matrix C is the price attribute matrix. The component x is the attribute price vector. The component w in the embodiment described is a price weighting function.

The embodiment for calculating a reference price can also provide for the price weighting function vector w. Each price can be assigned a weight reflecting how much weight the attribute decomposition model should put on that price. For example, the prices for a competitor with 90% of the market could receive a higher weight than a competitor with 2% of the market. Similarly high velocity products could be weighted heavier than slow moving products.

The embodiment for calculating a reference price can also provide for prior probability distribution $\Phi$. The prior probability distribution $\Phi$ for the attribute model can be supplied to the price decomposition model. The prior probability distribution $\Phi$ can contain useful information for the model regarding expectations based on experience, intuition, and the like. The prior probability distribution $\Phi$ can also facilitate overcoming problems associated with scarcity of information in the dataset.

The embodiment for calculating a reference price can also provide for an attribute price vector x. The attribute price vector is calculated by maximizing the posterior likelihood function $\Psi$, as explained elsewhere in this application.

The embodiment for calculating a reference price can also provide for updating the attribute state y. The attribute state y can in one mode of practicing the embodiment be defined as $y_i = Ay_{i-1} + Bx_i$. Here, the term B is a matrix equal to the product of the price weighting function vector w and the identify matrix. The term A is a matrix equal to the identify function minus matrix B.

Having provided for these components, one mode of practicing the embodiment can determine a reference r as $r_i = Cy_i$. Because the reference price in this embodiment is calculated based on the perceived price, the reference price that is calculated is more precisely described as a perceived reference price. The perceived reference price can be transformed back into a price basis from the price perception basis. For many applications it may be preferred to retain the price in the perceptual, rather than actual, space.

Modeling to Exclude Outliers

A modeler in an embodiment is constructed to inference values of such parameters as elasticity and promo lifts based on maximizing joint probability of the occurred events. For some cases the set of observations may be insufficient or too unreliable to obtain trustworthy estimates of the parameters. Sales data often contain points qualified as outliers that can bias parameters estimates. Outliers are atypical, infrequent observations. Outliers can have a large influence on the values of the modeling parameters. A single outlier is capable of considerably changing optimization involved in the regression and, consequently, the value of the parameters, as demonstrated in the following example.

Figure 4:
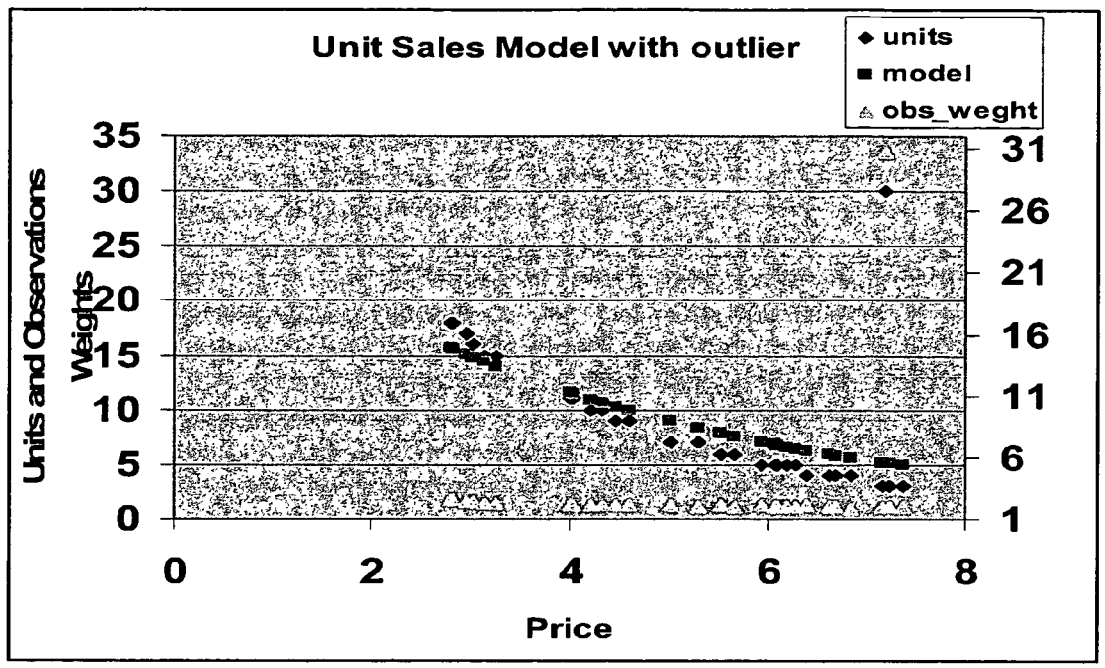
FIG. 4 is a chart illustrating a unit sales model.

FIG. 4 below demonstrates a data set of fairly deterministic integer unit sales with low noise content and without outliers. Data set was generated by expression US=Int(Exp(qo−beta*p)+Noise) with values of beta=0.4, qo=4, and average p=$4.99. The model is defined by minimizing sum over statistical Poisson weights and returns accurate parameter estimates of beta=0.39 and q0=3.97. Observation weights are fairly small and follow the pattern of Poisson probability with variance being equal to the mean.

Figure 5:
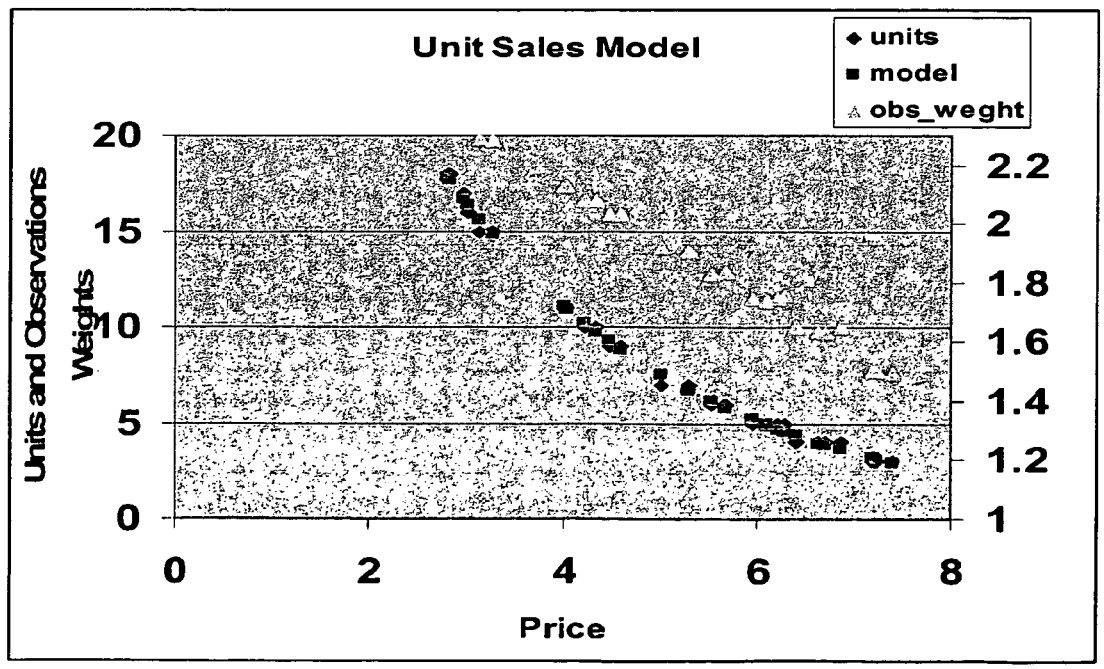
FIG. 5 is a chart illustrating a unit sales model with outliers.

FIG. 5 demonstrates a data set of integer unit sales with low noise content and one outlier added (unmarked promo event). Model returns deteriorated values for parameter estimates of beta=0.25 and q0=3.46. Observation weight is much higher for the outlier and therefore numerical value of the likelihood function can be considerably reduced by excluding outlier.

Some quantitative methods can be developed to exclude outliers. For example, exclusion of the observations that are outside the range of ±2 standard deviation (or even ±1.5 standard deviations) around the model mean. The solution is complicated by the fact that defining an outlier is subjective and the decisions concerning how to identify them must be made on an individual basis taking into account specific experimental paradigms and/or "accepted practice" and general research experience in the respective area.

An embodiment can provide the ability for modeler to identify and exclude outliers from the modeling cycles. An embodiment can provide adjustable numerical parameters (thresholds) to filter outliers. An embodiment can provide the ability to mark and preserve outliers in the sales data for future analysis and identification.

An embodiment can facilitate reduction of manual interventions during production Modeler runs from the services team.

An embodiment of the Modeler product can identify data points that have high probability of being outliers. The identification approach can take in account a variety of factors including, for example, statistical weight of the data points, time weight, over dispersion, size of the statistical sample, overall information content of the data set, forces analysis on price group level.

Events (data points) with statistical weight above outlier threshold can be eliminated from the Modeling cycle by assigning unique exception code. Eliminated events (data points) can carry on exception code specific for "Modeling outliers" in output table. The assigned exception code can be preserved for analysis. An embodiment of the Modeler can finish a round of modeling by minimizing function of joint probability of the occurred events without attempting to identify outliers.

A logical switch for outlier removal can be supplied as input to the Modeler to reflect decision of the end-user to perform or withhold outlier analysis. This switch can have Micro Market level resolution. Upon selection of outlier removal option in the Modeler product, Modeler can perform analysis of the data points to identify outliers. Outlier analysis can be based on the numerical values of the statistical weights of data points. Statistical weight of the data point can be taken as its numerical contribution to the likelihood function and includes over dispersion as well as time weight.

An additional set of numerical parameters can be supplied as input to an embodiment of the Modeler to control outlier analysis. These parameters can have an effective level of resolution and can define main thresholds on the process of outlier's removal. Main thresholds can include, for example, an outlier threshold, a points fraction threshold, and a time recent threshold.

An outlier threshold can be supplied as input to an embodiment of the modeler. It can provide a numerical value of the statistical weight above which data point can be marked as outlier. For example if outlier threshold=4 then data points with statistical weight above 4 can be marked as outliers and potentially excluded from the modeling. Such a numerical value of outlier threshold signifies exclusion of the observations that are outside the range of ±2 (=sqrt(4)) time weighted standard deviation around the model mean. Time weight can be an attribute of the likelihood function and can be included in the outlier analysis. Thus for the data points with time weight=0.25, "outlier threshold" of 4 will result in exclusion of the observations that are outside the range of ±4(=sqrt (outlier threshold/time weight)) standard deviation around the model mean. Inclusion of the time weight in outlier analysis helps reduce required for analysis time and improves stability of the process.

A points fraction threshold can be supplied as input to an embodiment of the modeler. It can provide a numerical value of the percentage of the data points that can be marked as outliers. For example with "points fraction threshold"=0.05 only up to 5% of the data points can be marked as outliers and potentially excluded from the modeling. "Points fraction threshold "will have higher priority compare to "outlier threshold". Therefore if selected "outlier threshold" generates too many "outliers", "outlier threshold" parameter will be adjusted (increased) to reduce the total number of outliers;

A time recent threshold can also be supplied as input to an embodiment of the modeler. It can provide a numerical value showing how many most recent time keys are protected from the outlier removal process. Most recent time keys have the highest input in the likelihood function due to the increased time weight. Therefore it can be important not to eliminate most recent time keys from the modeling process. For example with "time recent threshold"=5, contribution to the likelihood function coming from the five most recent time keys will be protected from the outlier removal process.

An embodiment of the Modeler can assign specific for outliers exception code to the data points identified as outliers to provide for eliminating them from subsequent round of modeling. The modeler can perform additional rounds of modeling until all parameters are converged within parameter space and all outliers have been identified. Calculation of the over dispersion parameters may treat outlier as valid data points, as may be required for robustness of the over dispersion estimate as well as for stability of the process.

An embodiment of the modeler may output final values of threshold parameters in assigned file (table) for analysis. Exception codes assigned by the Modeler can be output in, for example, relevant output files and loaded to one or more other tables.

One step of an embodiment of the modeler can read in outlier removal as input. Outlier removal can be a logical parameter coming from a suitable source such as, for example, a modeler setup file. As a default value as the outlier removal flag may be set to false. The modeler can provide logical switch to reflect decision of the end-user to perform or withhold outlier analysis.

Another process of an embodiment of the modeler can read in values of thresholds necessary for the outlier analysis from a suitable source such as, for example, a modeler setup file. As a default value the thresholds may be set to zero. The modeler can provide a set of threshold numerical values for outlier analysis as input parameters.

Another process of an embodiment of the modeler can provide stable estimates of modeling parameters during initial part of the modeling. Providing stable estimates of modeling parameters initially may avoid impacting actual performance and time. Initial parameter's values can be saved in an assigned file or table for the analysis of outlier impact. An embodiment of the modeler can provide the ability to preserve identified outliers for farther analysis by populating exception codes in an appropriate file, table, or other repository.

Implementation in a Computer System

A functional unit is an entity of hardware or software, or both, capable of accomplishing a specified purpose. Hardware is all or part of the physical components of an information processing system. Software includes all or part of the programs, procedures, rules, and associated documentation of an information processing system. An information processing system is one or more data processing systems and devices, such as office and communication equipment, that perform information processing. A data processing system includes one or more computers, peripheral equipment, and software that perform data processing.

A computer is a functional unit that can perform substantial computations, including numerous arithmetic operations and logic operations without human intervention. A computer can consist of a stand-alone unit or can comprise several interconnected units. In information processing, the term computer usually refers to a digital computer, which is a computer that is controlled by internally stored programs and that is capable of using common storage for all or part of a program and also for all or part of the data necessary for the execution of the programs; performing user-designated manipulation of digitally represented discrete data, including arithmetic operations and logic operations; and executing programs that modify themselves during their execution. A computer program is syntactic unit that conforms to the rules of a particular programming language and that is composed of declarations and statements or instructions needed to solve a certain function, task, or problem. A programming language is an artificial language (a language whose rules are explicitly established prior to its use) for expressing programs.

A computer typically includes a processor, including at least an instruction control unit and an arithmetic and logic unit. The processor is generally a functional unit that interprets and executes instructions. An instruction control unit in a processor is generally the part that retrieves instructions in proper sequence, interprets each instruction, and applies the proper signals to the arithmetic and logic unit and other parts in accordance with this interpretation. The arithmetic and logic unit in a processor is generally the part that performs arithmetic operations and logic operations.

A program or computer program is generally a syntactic unit that conforms to the rules of a particular programming language and that is composed of declarations and statements or instructions needed to solve a certain function, task, or problem. A programming language is generally an artificial language for expressing programs. A computer system is generally one or more computers, peripheral equipment, and software that perform data processing. An end user in general includes a person, device, program, or computer system that utilizes a computer network for the purpose of data processing and information exchange.

Software for an information processing system can be stored as instructions and the like on a computer readable medium in a variety of forms. The present invention applies equally regardless of the particular type of signal bearing computer readable media actually used to carry out the distribution. Computer readable media includes any recording medium in which computer code may be fixed, including but not limited to CD's, DVD's, semiconductor RAM, ROM, or flash memory, paper tape, punch cards, and any optical, magnetic, or semiconductor recording medium or the like. Examples of computer readable media include recordable-type media such as floppy disk, a hard disk drive, a RAM, and CD-ROMs, DVD-ROMs, an online internet web site, tape storage, and compact flash storage, and transmission-type media such as digital and analog communications links, and any other volatile or non-volatile mass storage system readable by the computer. The computer readable medium includes cooperating or interconnected computer readable media, which exist exclusively on single computer system or are distributed among multiple interconnected computer systems that may be local or remote. Many other configurations of these and similar components (which can also comprise computer system) are considered equivalent and are intended to be encompassed within the scope of the claims herein.

Figure 6:
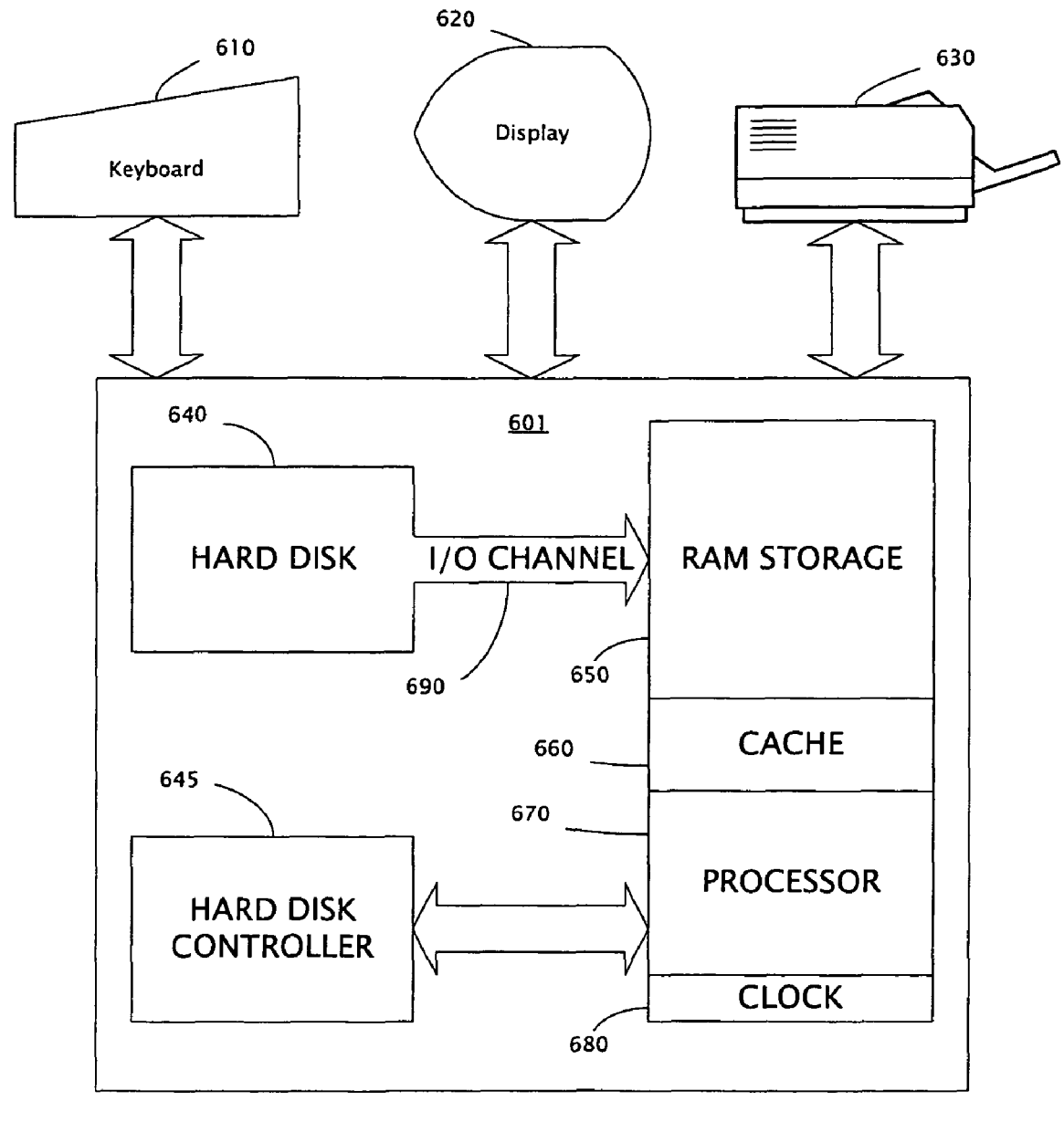
FIG. 6 is a block diagram that generally depicts a configuration of one embodiment of hardware suitable for improved data mining algorithm selection based on good feature distribution.

Referring now to FIG. 6, there is disclosed a block diagram that generally depicts an example of a configuration of hardware (600) suitable for automatic mapping of raw data to a processing algorithm. A general-purpose digital computer (601) includes a hard disk (640), a hard disk controller (645), ram storage (650), an optional cache (660), a processor (670), a clock (680), and various I/O channels (690). In one embodiment, the hard disk (640) will store data mining application software, raw data for data mining, and an algorithm knowledge database. Many different types of storage devices may be used and are considered equivalent to the hard disk (640), including but not limited to a floppy disk, a CD-ROM, a DVD-ROM, an online web site, tape storage, and compact flash storage. In other embodiments not shown, some or all of these units may be stored, accessed, or used off-site, as, for example, by an internet connection. The I/O channels (690) are communications channels whereby information is transmitted between RAM storage and the storage devices such as the hard disk (640). The general-purpose digital computer (601) may also include peripheral devices such as, for example, a keyboard (610), a display (620), or a printer (630) for providing run-time interaction and/or receiving results.

Many other particular modes and embodiments of an attribute modeler in accordance with the teachings of the present invention are possible including, For example, reference price model in which the reference price of an item can be modeled based on attributes including, for example, product, store and time attributes. All such particular modes, embodiments, and the like are intended to be encompassed within the scope of this application.

While the methods and embodiments disclosed herein have been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

While the present invention has been described in the context of particular exemplary data structures, processes, and systems, those of ordinary skill in the art will appreciate that the processes of the present invention are capable of being distributed in the form of a computer readable medium of instructions and a variety of forms and that the present invention applies equally regardless of the particular type of signal bearing computer readable media actually used to carry out the distribution. Computer readable media includes any recording medium in which computer code may be fixed, including but not limited to CD's, DVD's, semiconductor ram, rom, or flash memory, paper tape, punch cards, and any optical, magnetic, or semiconductor recording medium or the like. Examples of computer readable media include recordable-type media such as floppy disc, a hard disk drive, a RAM, and CD-ROMs, DVD-ROMs, an online internet web site, tape storage, and compact flash storage, and transmission-type media such as digital and analog communications links, and any other volatile or non-volatile mass storage system readable by the computer. The computer readable medium includes cooperating or interconnected computer readable media, which exist exclusively on single computer system or are distributed among multiple interconnected computer systems that may be local or remote. Those skilled in the art will also recognize many other configurations of these and similar components which can also comprise computer system, which are considered equivalent and are intended to be encompassed within the scope of the claims herein.

Although embodiments have been shown and described, it is to be understood that various modifications and substitutions, as well as rearrangements of parts and components, can be made by those skilled in the art, without departing from the normal spirit and scope of this invention. Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein. The appended claims are contemplated to cover the present invention any and all modifications, variations, or equivalents that fall within the true spirit and scope of the basic underlying principles disclosed and claimed herein.

The invention claimed is:

1. An attribute modeler method for modeling attributes of a system, said method comprising:
   providing for an initialization step during which inputs are received by the attribute modeler, the inputs including a calibration data set, a likelihood function describing a probability of observing data specified in the calibration data set given certain attributes and attribute parameters, a first order prior function describing a probability of observing the certain attribute parameters; a gradient of the first order prior function, a Hessian of the first order prior function, a second order prior function, a gradient of the second order prior function, and a Hessian of second order prior function;
   providing a flexible interface in which the likelihood function, and the first order prior function are written in a programming language;
   providing for attribute parameter bounding in which attribute parameters determined to be too large are sequentially locked down based on assigned priorities, such that one attribute parameter is locked down at a time and the system remodeled to determine the effect on other attribute parameters;
   providing for outlier flagging in which anomalous elements in the said calibration data set are identified by calculating the force that the outlier is exerting on the model using the gradient of the likelihood function;
   providing for output comprising attribute parameters, forces that outliers are exerting on the model, and confidence intervals, wherein the attribute modeler utilizes at least one processor to provide said output.

2. The method of claim 1, wherein the calibration data set comprises an event key uniquely identifying events, an empirically observed data set used to tune the model, an attribute list for the calibration data set, a weight specifying record confidence, and an sputter flag.

3. The method of claim 1, wherein the second order prior function describes the probability of observing second order prior parameters, wherein the second order prior parameters are for use in modeling relationships between and among the certain attribute parameters.

\* \* \* \* \*